United States Patent
Chambers

(10) Patent No.: US 7,533,326 B2
(45) Date of Patent: May 12, 2009

(54) ADAPTIVE DECODER FOR DECODING AN ASYNCHRONOUS DATA STREAM

(75) Inventor: Peter Chambers, Phoenix, AZ (US)

(73) Assignee: Micrel, Inc., San Jose, CA (US)

( * ) Notice: Subject to any disclaimer, the term of this patent is extended or adjusted under 35 U.S.C. 154(b) by 534 days.

(21) Appl. No.: 11/295,318

(22) Filed: Dec. 6, 2005

(65) Prior Publication Data
US 2007/0130497 A1 Jun. 7, 2007

(51) Int. Cl.
*H03M 13/00* (2006.01)
(52) U.S. Cl. .................. 714/780; 714/786; 714/789
(58) Field of Classification Search ........... 714/780, 714/786, 789, 797, 781; 370/504, 316
See application file for complete search history.

(56) References Cited

U.S. PATENT DOCUMENTS

| | | | | |
|---|---|---|---|---|
| 3,906,484 A | * | 9/1975 | Melvin et al. | 375/370 |
| 4,001,692 A | * | 1/1977 | Fenwick et al. | 714/797 |
| 6,556,590 B1 | * | 4/2003 | Saeijs et al. | 370/504 |
| 6,694,476 B1 | * | 2/2004 | Sridharan et al. | 714/781 |
| 6,701,060 B2 | * | 3/2004 | Yuen et al. | 386/46 |
| 7,190,681 B1 | * | 3/2007 | Wu | 370/316 |

* cited by examiner

*Primary Examiner*—Esaw T Abraham
*Assistant Examiner*—Fritz Alphonse
(74) *Attorney, Agent, or Firm*—Patent Law Group LLP; Carmen C. Cook

(57) ABSTRACT

A data decoder for decoding an asynchronous incoming data stream includes a bit engine receiving information describing the incoming data stream and generating a decoded data stream. In one embodiment, the bit engine includes a best-fit bit analysis block performing a pattern match operation for each data bit of the incoming data stream using the information describing the incoming data stream. The best-fit bit analysis block is operative to find a pattern of data bits that best matches the data bits in the incoming data stream. The bit engine further includes a missing bit insertion block to insert a dummy bit for each data bit where the best-fit bit analysis block cannot find a pattern match. An error correction block performs forward error correction on the decoded data stream, including the dummy bits, to generate a corrected outgoing data stream.

19 Claims, 3 Drawing Sheets

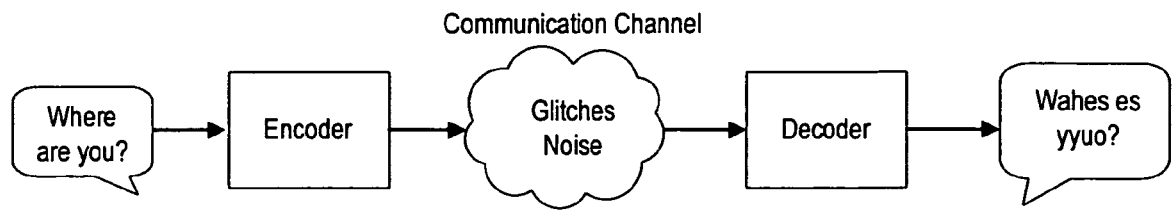
Figure 1 *(Prior Art)*
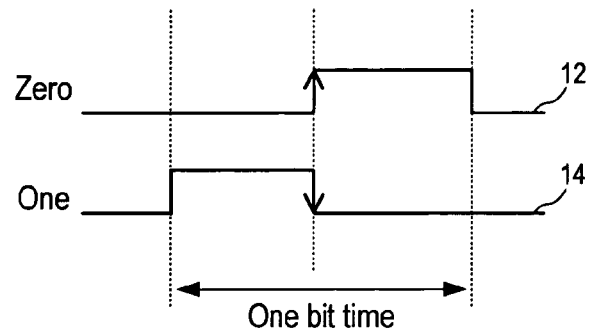
Figure 2 *(Prior Art)*

ADAPTIVE DECODER FOR DECODING AN ASYNCHRONOUS DATA STREAM

FIELD OF THE INVENTION

The invention relates to data decoders and, in particular, to an adaptive decoder for decoding an asynchronous data stream.

DESCRIPTION OF THE RELATED ART

A communication system, particularly a wireless communication system, often requires information to be transmitted over a noisy and sometimes poor quality communication channel. A decoder, such as a digital decoder, is often used to recover synchronous or asynchronous data that has passed through such a noisy communications channel where the data is often corrupted. FIG. 1 is a conceptual diagram illustrating the corruption of data as information is transmitted from an encoder to a decoder over a noisy communication channel. Referring to FIG. 1, data representing the message "Where are you?" is encoded by an encoder and then transmitted over a communication channel that is noisy where the encoded data becomes corrupted. A decoder receiving the transmitted data may end up decoding the data as "Wahes es yyuo?".

While many solutions exist in the industry to create robust communications systems that can tolerate noisy communication environments, these solutions are largely applicable to synchronous systems where the encoded data arrives at the decoder at a predictable rate. In such systems, it is easy to determine if a bit can or cannot be correctly decoded. If not, standard Forward Error Correction (FEC) or Error Detection And Correction (EDAC) algorithms may be used to recover the original data.

In an asynchronous system, the situation is made more difficult since the data does not arrive at a known rate. Instead, the incoming data must be examined for transitions (edges) to see exactly where individual bits lie. The asynchronous nature of the received data makes it much harder to decode the received data where bits, or groups of bits, in the received data may be lost or corrupted.

A decoder for reliably and accurately decoding asynchronous data transmission is desired.

SUMMARY OF THE INVENTION

According to one embodiment of the present invention, a data decoder for decoding an asynchronous incoming data stream includes an incoming data processing block for receiving the incoming data stream and analyzing the incoming data stream to generate information describing the incoming data stream, a bit engine receiving the information describing the incoming data stream and generating a decoded data stream, and an error correction block receiving the decoded data stream and performing forward error correction on the decoded data stream.

In one embodiment, the bit engine includes a best-fit bit analysis block performing a pattern match operation for each data bit of the incoming data stream using the information describing the incoming data stream. The best-fit bit analysis block is operative to find a pattern of data bits that best matches the data bits in the incoming data stream. The bit engine further includes a missing bit insertion block to insert a dummy bit for each data bit where the best-fit bit analysis block cannot find a pattern match. The error correction block performs forward error correction to correct the data values of the dummy bits to generate a corrected outgoing data stream having corrected data values.

According to another aspect of the present invention, a method of decoding an asynchronous incoming data stream including receiving the incoming data stream, analyzing the incoming data stream, generating information describing the incoming data stream, performing a pattern match for each data bit of the incoming data stream using the information describing the incoming data stream, determining a pattern of data bits that best matches the data bits in the incoming data stream using best-fit bit analysis, inserting a dummy bit for each data bit where the best-fit bit analysis cannot find a pattern match. As a result, a decoded data stream is generated. Finally, the method includes correcting errors in the decoded data stream using forward error correction routines to generate an outgoing data stream having corrected data values.

The present invention is better understood upon consideration of the detailed description below and the accompanying drawings.

BRIEF DESCRIPTION OF THE DRAWINGS

FIG. 1 is a conceptual diagram illustrating the corruption of data as information is transmitted from an encoder to a decoder over a noisy communication channel.

FIG. 2 is a waveform diagram illustrating the Manchester coding scheme.

DETAILED DESCRIPTION OF THE PREFERRED EMBODIMENTS

Figure 3:
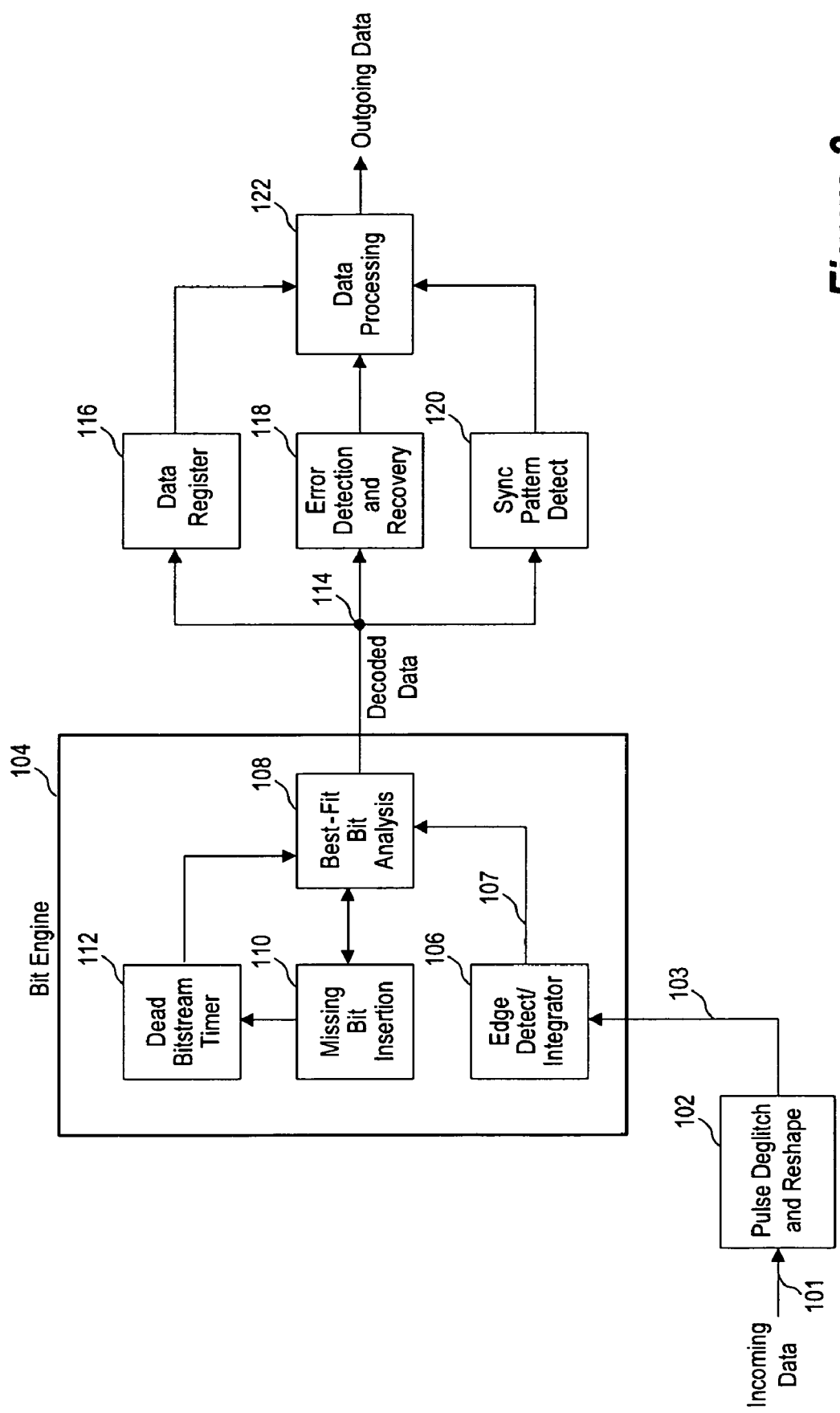
FIG. 3 is a block diagram of an adaptive decoder capable of receiving asynchronous data communication according to one embodiment of the present invention.

In accordance with the principles of the present invention, an adaptive decoder receiving an incoming asynchronous data stream tracks the data stream and inserts placeholders for unrecoverable data. The adaptive decoder is capable of accurately analyzing the characteristics of the incoming asynchronous data and decoding the incoming data even when the incoming data include data bits that are lost to noise and corruption. The decoded data may include inserted dummy bits as placeholders for data that cannot be recovered from the incoming data. The decoded data can then be corrected using any known forward error correction schemes.

The adaptive decoder of the present invention is applicable in a communication system where the transmitted data is encoded using a given data encoding scheme to render the transmitted data easier to decode. Furthermore, while the data can be transmitted synchronously or asynchronously, the adaptive decoder of the present invention treats the incoming data as asynchronous transmission for the purpose of decoding the incoming data. Thus, not only is the adaptive decoder of the present invention applicable in an asynchronous data communication system, the decoder can also be applied in a synchronous communication system where there are large inaccuracies in the clock generation between the encoder and the decoder. The adaptive decoder of the present invention thus has wide application in a wide variety of communication systems.

In the following description, it is assumed that data is transmitted over a noisy or poor quality communication channel which may corrupt an occasional encoded data bit or even a sequential burst of data bits. The adaptive decoder of the present invention operates to decode the corrupted incoming data stream to provide valid decoded data which can be further corrected using a forward error correction scheme. When the adaptive decoder of the present invention is used, the probability that corrupted incoming data can be properly decoded is increased so that the necessity of rejecting and retransmitting the data is reduced.

In the following description, it is assumed that the communication system encodes the transmitted data using the Manchester coding scheme. FIG. 2 is a waveform diagram illustrating the Manchester coding scheme. The Manchester coding scheme encodes data by replacing each data bit with a waveform pattern that always has an edge at the center of each bit time. Referring to FIG. 2, a "zero" data value is encoded by having a rising edge at the center of each bit time (waveform 12) while a "one" data value is encoded by having a falling edge at the center of each bit time (waveform 14). The advantage of the Manchester coding scheme is that every bit has at least one transition edge, which makes decoding simpler.

In synchronous communication systems, the clock recovery phase-locked loop (PLL) can synchronize to the transitions in the Manchester encoded data and create an accurate time reference for bit recovery. While synchronous systems have a substantial advantage of a deterministic data rate, they require more expensive clock systems. If the complete clock generation system is incorporated on-chip, the cost of an encoder or decoder can be reduced by eliminating external (off-chip) components. However, the penalty for integrating the clock systems with the encoder or decoder is that on-chip oscillators are typically no better than +/−10% accurate over variation in process, voltage, and temperature.

Consider a communication system where both the encoder and the decoder include on-chip clock generation. Due to process, voltage and temperature variations, the encoder's clock may run 10% fast while the decoder's clock may run 10% slow. From the perspective of the encoder, the decoder's clock is seen as running 22.2% faster. The difference in clock rate is substantial and makes standard synchronous clock recovery impractical. Therefore, such a communication system is managed as asynchronous by the decoder. The adaptive decoder of the present invention can be advantageously applied in such a synchronous communication system to provide effective decoding of the transmitted data.

FIG. 3 is a block diagram of an adaptive decoder capable of receiving asynchronous data communication according to one embodiment of the present invention. Referring to FIG. 3, a decoder 100 for receiving incoming asynchronous data stream includes a pulse deglitch and reshape block 102. Pulse deglitch and reshape block 102 receives incoming data on a port 101 and applies high frequency and other filtering functions to the incoming data and generally "cleans up" the data. The cleaned up incoming data is supplied to a bit engine 104 via a bus 103 to be decoded.

Bit engine 104 includes a collection of functional blocks 106 to 112 for performing the task of recovering the transmitted data from the incoming data stream where the incoming data stream has been transmitted over a noisy communications channel that may have corrupted the transmitted data. In the present embodiment, bit engine 104 includes an edge detect/integrator block 106, a best-fit bit analysis block 108, a missing bit insertion block 110 and a dead bitstream timer 112.

First, the cleaned up incoming data is passed to the edge detect/integrator block 106 which detects and isolates the positive-going (going high) edges and the negative-going (going low) edges on the incoming data. The edge detect/integrator block 106 also measures the duration of successive high/low transitions. That is, block 106 measures the duration of a high pulse followed by a low period in the incoming data.

The edge detect/integrator block 106 provides the detected high/low edges and the detected high/low period in the incoming data to the best-fit bit analysis block 108. Best-fit bit analysis block 108 tracks the sequence of high/low edges in conjunction with the high/low period. Best-fit bit analysis block 108 attempts to find a pattern of contiguous flow of data bits that best matches the incoming data stream.

In a conventional decoder, the best fit analysis attempts to find a pattern match on the incoming data and if a pattern match cannot be found, the conventional decoder will reject the incoming data, requiring the data to be retransmitted. When the channel is noisy, data rejection may occur frequently, causing undesired increased in network traffic when data has to be retransmitted. Furthermore, when the incoming data is rejected by the best-fit analysis, the data is often rejected prematurely before any forward error correction routine has a chance to correct and recover the data.

To the contrary, the adaptive decoder 100 of the present invention includes a bit engine where the best-fit analysis is assisted by the missing bit insertion block 110 to decode the incoming data. A dummy bit is inserted whenever the best-fit analysis cannot find a pattern match for the data bit in the incoming data stream. In this manner, a decoded data stream, which may include dummy bits inserted as placeholders, is generated and provided to the forward error correction block for further error correction. When the adaptive decoder of the present invention is used, occurrences of incoming data rejection can be reduced and forward error correction functions, which are inherent in all decoders, are better utilized.

Of course, there exist situations where the incoming data bits are so corrupted that no effective data correction and recovery can be carried out. In that case, adaptive decoder 100 of the present invention will operate to reject the incoming data and wait for the data to be retransmitted, as will be described in more detail below.

Figure 4:
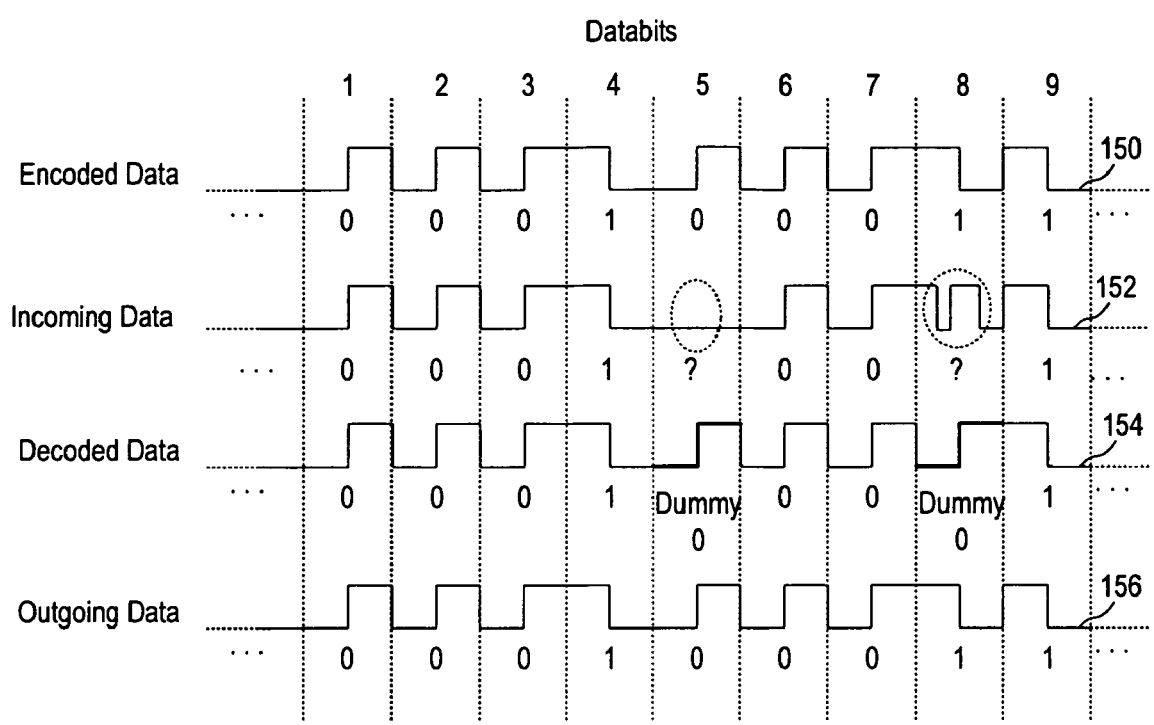
FIG. 4 is a waveform diagram illustrating the decoding of incoming data using the adaptive decoder of the present invention.

The operation of the best-fit analysis block 108 and the missing bit insertion block 110 will be described with reference to FIG. 4 which is a waveform diagram illustrating the process of decoding the incoming data stream using adaptive decoder 100. Referring to FIG. 4, the first waveform 150 illustrates the encoded data to be transmitted. Thus, waveform 150 represents the correct data that should be provided by the decoder. The second waveform 152 illustrates the cleaned up incoming data with data bits that have been corrupted during the data transmission process. The third waveform 154 illustrates the decoded data generated by bit engine 104 of adaptive decoder 100 of the present invention. Finally, the fourth waveform 156 illustrates the corrected outgoing data generated by adaptive decoder 100.

In operation, best-fit bit analysis block 108 receives information describing the detected high/low edges and the detected high/low period in the incoming data from edge detect/integrator 106. The information describes the cleaned-up incoming data stream shown as waveform 152 in FIG. 4. Best-fit bit analysis block 108 operates to find a pattern match for each data bit. Thus, best-fit bit analysis is able to match a "zero" data pattern to bits 1-3 and a "one" data pattern to bit 4 in the incoming data.

However, when the best-fit bit analysis block 108 cannot match a bit successfully given the information provided by the edge detect/integrator 106, the missing bit insertion block 110 will operate to replace the corrupted data with a dummy bit. The dummy bit thus operates as a placeholder for the corrupted or missing data bit. The dummy bit can have a data value of "one" or "zero." The exact value of the dummy bit is not critical to the practice of the present invention. In the present embodiment, the dummy bit has a "zero" data value.

Thus, in the illustration shown in FIG. 4, bit 5 in the incoming data stream (waveform 152) is severely corrupted so that no pattern match can be made on the data bit. Missing bit insertion block 100 then operates to insert a "zero" data bit for bit 5 (waveform 154). Further on in the data stream, bit 8 is also severely corrupted and a "zero" dummy bit has also been inserted in its place.

It is instructive to note that in the conventional decoder, when a data bit fails the pattern match, the decoder will reject the incoming data, requiring the data to be retransmitted. However, in accordance with the present invention, when a data bit fails the pattern match, the decoder operates to insert a dummy bit as placeholder so that a valid decoded data stream can be generated. The frequency of incoming data rejection is thus reduced and the forward error correction capability of the decoder can be better utilized.

By the operation of the best-fit bit analysis block 108 and the missing bit insertion block 110, the incoming data is turned into a decoded data stream including a sequence of zeros, ones, and dummy bits which appears as valid zeros (waveform 154 in FIG. 4). The decoded data stream provided by bit engine 104 on bus 114 can thus be processed for error correction where the dummy bits can be corrected by the decoder's forward error correction routine to their correct values. After the necessary correction by the forward error correction routines in decoder 100, a corrected outgoing data having the same data values as the encoded data is generated (waveform 156).

In the present embodiment, bit engine 104 includes dead bitstream timer block 112 to limit the number of dummy bits that can be sequentially inserted into the decoded data stream. Adaptive decoder 100 recognizes that at some point, the incoming data is so badly corrupted that no useful information can be recovered from the incoming data stream. In that case, the decoding operation should be terminated and the incoming data rejected while the decoder waits for further valid data. The dead bitstream timer should have a dummy bit limit that exceeds the error correction capability of the error correction routine implemented in the decoder. In this manner, the maximum number of dummy bits can be inserted in the decoded data stream and the full capability of the error correction routine can be applied to correct the data. If the dummy bit limit is set too low, incoming data may be rejected unnecessarily. Because of the binary nature of a digital communication system, bit engine 104 in decoder 100 actually has a 50% chance of inserting the correct data value for a corrupted bit. Therefore, the burden on the error correction routine is actually reduced and a large number of dummy bits can be tolerated by the error correction routine.

In one embodiment, the dead bitstream timer block 112 sets the maximum dummy bits limit to ten. Thus, when ten dummy bits have been inserted in a row by the missing bit insertion block 110, dead bitstream timer 112 will instruct the best-fit bit analysis block 108 to halt decoding and discard the decoded data as unrecoverable. Dead bitstream timer block 112 is optional and may be omitted in other embodiments of the present invention. In some cases, the adaptive decoder may be allowed to insert as many dummy bits as needed and the adaptive decoder relies on the error correction routine to accept or reject the incoming data.

By the above operation, bit engine 104 generates a decoded data stream including a series of zeros, ones, and dummy bits having zero data values (waveform 154 of FIG. 4). The decoded data stream on bus 114 is provided to three functional blocks in decoder 100. First, the decoded data stream is sent to a data register 116 which provides temporary data storage. The decoded data stream is also sent to an error detection and recovery block 118 which operates to actively correct the decoded data bits.

The error detection and recovery block 118 replaces the dummy bits with zeros, ones, or some sort of intelligently guessed "most likely" data before running its own data-correction algorithm. For example, after error correction is performed, the error detection and recovery block 118 should correct bit 8 in the decoded data stream to the correct data value of "one." Note that the other dummy bit 5 does not require correction as the correct data bit has the same data value zero as the dummy bit.

Finally, the decoded data stream is sent to a sync pattern detect block 120 which looks for critical sequences of valid bits. For instance, the sync pattern detect block 120 might look for a sequence of zeros and ones that explicitly identifies the start of a valid data packet.

The results and contents of blocks 116, 118 and 120 are sent to a data processing block 122. Data processing block 122 processes the information provided by blocks 116, 118 and 120 to generate an outgoing data stream being the final, valid, corrected data. In other embodiments, a Cyclic Redundancy Check (CRC) stage (or other error-correction method) can be included in decoder 100 to validate the outgoing data.

In one embodiment, adaptive decoder 100 is implemented in hardware. The implementation of adaptive decoder 100 of the present invention is inexpensive as no processor or DSP (Digital Signal Processor) is required. The adaptive decoder is compatible with low-cost on-chip oscillators, and can recover data effectively in very hostile communication environments.

The above description concerns one embodiment of the adaptive decoder of the present invention and is illustrative only and is not intended to be limiting. A decoder in accordance with the present invention may be constructed using different functional blocks to realize the decoding and error correction functions. The adaptive decoder of the present invention implements the novel data decoding method of by using missing bit insertion to assist in the best-bit bit analysis. The other functional blocks in adaptive decoder 100 of FIG. 3 are included to complete the decoding and error correction functions for the decoder and are not critical to the practice of the present invention. A decoder in accordance with the present invention may be formed using other functional blocks to complete the decoding and error correction functions.

Furthermore, in the above description, a data communication system using the Manchester coding scheme is described. The use of the Manchester coding scheme is illustrative only and the adaptive decoder of the present invention can be applied to other data encoding schemes. The exact encoding scheme used in the data communication system is not critical to the practice of the present invention. Thus, in the above description, an edge detect/integrator is used to isolate the transition edges of the incoming data which can be used to determine the value of the data bit under the Manchester coding scheme. When another data encoding scheme is used, the decoder may include other incoming data processing blocks to analyze the incoming data and provide the needed information describing the incoming data stream to allow the best-fit bit analysis to determine the data value of the received data bits.

The adaptive decoder of the present invention and the novel decoding method can be implemented in hardware or software.

The above detailed descriptions are provided to illustrate specific embodiments of the present invention and are not intended to be limiting. Numerous modifications and variations within the scope of the present invention are possible. The present invention is defined by the appended claims.

I claim:

1. A data decoder for decoding an asynchronous incoming data stream, the data decoder comprising:
   an incoming data processing block for receiving the incoming data stream and analyzing the incoming data stream to generate information describing the incoming data stream;
   a bit engine receiving the information describing the incoming data stream and generating a decoded data stream, the bit engine comprising:
      a best-fit bit analysis block performing a pattern match operation for each data bit of the incoming data stream using the information describing the incoming data stream, the best-fit bit analysis block operative to find a pattern of data bits that best matches the data bits in the incoming data stream; and
      a missing bit insertion block to insert a dummy bit for each data bit where the best-fit bit analysis block cannot find a pattern match; and
   an error correction block receiving the decoded data stream and performing forward error correction on the decoded data stream, the error correction block generating a corrected outgoing data stream having corrected data values.

2. The data decoder of claim 1, wherein the incoming data stream comprises an encoded data stream.

3. The data decoder of claim 2, wherein the incoming data stream comprises a data stream encoded using the Manchester coding scheme.

4. The data decoder of claim 3, wherein the incoming data processing block comprises an edge detect and integrator block for detecting and isolating the positive-going edges and the negative-going edges of the incoming data stream and also for measuring the duration of successive high/low transitions.

5. The data decoder of claim 4, wherein the incoming data processing block further comprises a pulse deglitch and reshape block for performing filtering functions on the incoming data stream.

6. The data decoder of claim 1, further comprising:
   a dead bitstream timer for counting the number of dummy bits inserted consecutively by the missing bit insertion block, the dead bitstream timer asserting a signal when the number of dummy bits inserted consecutively reaches a predetermined limit, the signal operative to terminate the decoding of the incoming data stream and instruct the bit engine to reject the incoming data stream as invalid.

7. The data decoder of claim 6, wherein the predetermined limit of the dead bitstream timer comprises a number of corrupted data bits in a row exceeding the error correction capability of the error correction block.

8. The data decoder of claim 6, wherein the predetermined limit is 10 dummy bits.

9. The data decoder of claim 1, wherein the dummy bit has a data value of one or zero.

10. The data decoder of claim 1, further comprising:
    a data register for storing the decoded data stream; and
    a sync pattern detect block for detecting specific sequences of valid bits in the decoded data stream.

11. A method of decoding an asynchronous incoming data stream comprising:
    receiving the incoming data stream;
    analyzing the incoming data stream;
    generating information describing the incoming data stream;
    performing a pattern match for each data bit of the incoming data stream using the information describing the incoming data stream;
    determining a pattern of data bits that best matches the data bits in the incoming data stream using best-fit bit analysis;
    inserting a dummy bit for each data bit where the best-fit bit analysis cannot find a pattern match, thereby generating a decoded data stream; and
    correcting errors in the decoded data stream using forward error correction routines to generate an outgoing data stream having corrected data values.

12. The method of claim 11, wherein the incoming data stream comprises an encoded data stream.

13. The method of claim 12, wherein the incoming data stream comprises a data stream encoded using the Manchester coding scheme.

14. The method of claim 13, wherein analyzing the incoming data stream comprises:
    detecting and isolating the positive-going edges and the negative-going edges of the incoming data stream; and
    measuring the duration of successive high/low transitions.

15. The method of claim 14, wherein analyzing the incoming data stream further comprises:
    filtering the incoming data stream prior to detecting and isolating the positive-going edges and the negative-going edges of the incoming data stream.

16. The method of claim 11, further comprising:
    counting the number of dummy bits inserted consecutively;
    asserting a signal when the number of dummy bits inserted consecutively reaches a predetermined limit; and
    terminating the decoding of the incoming data stream and rejecting the incoming data stream as invalid as a result of the signal being asserted.

17. The method of claim 16, wherein the predetermined limit of the dead bitstream timer comprises a number of corrupted data bits in a row exceeding the error correction capability of the error correction routines.

18. The method of claim 17, wherein the predetermined limit is 10 dummy bits.

19. The method of claim 11, wherein the dummy bit has a data value of one or zero.

* * * * *